March 8, 1927. 1,620,218
E. McPHAIL
LUGGAGE CARRIER
Filed June 22, 1926
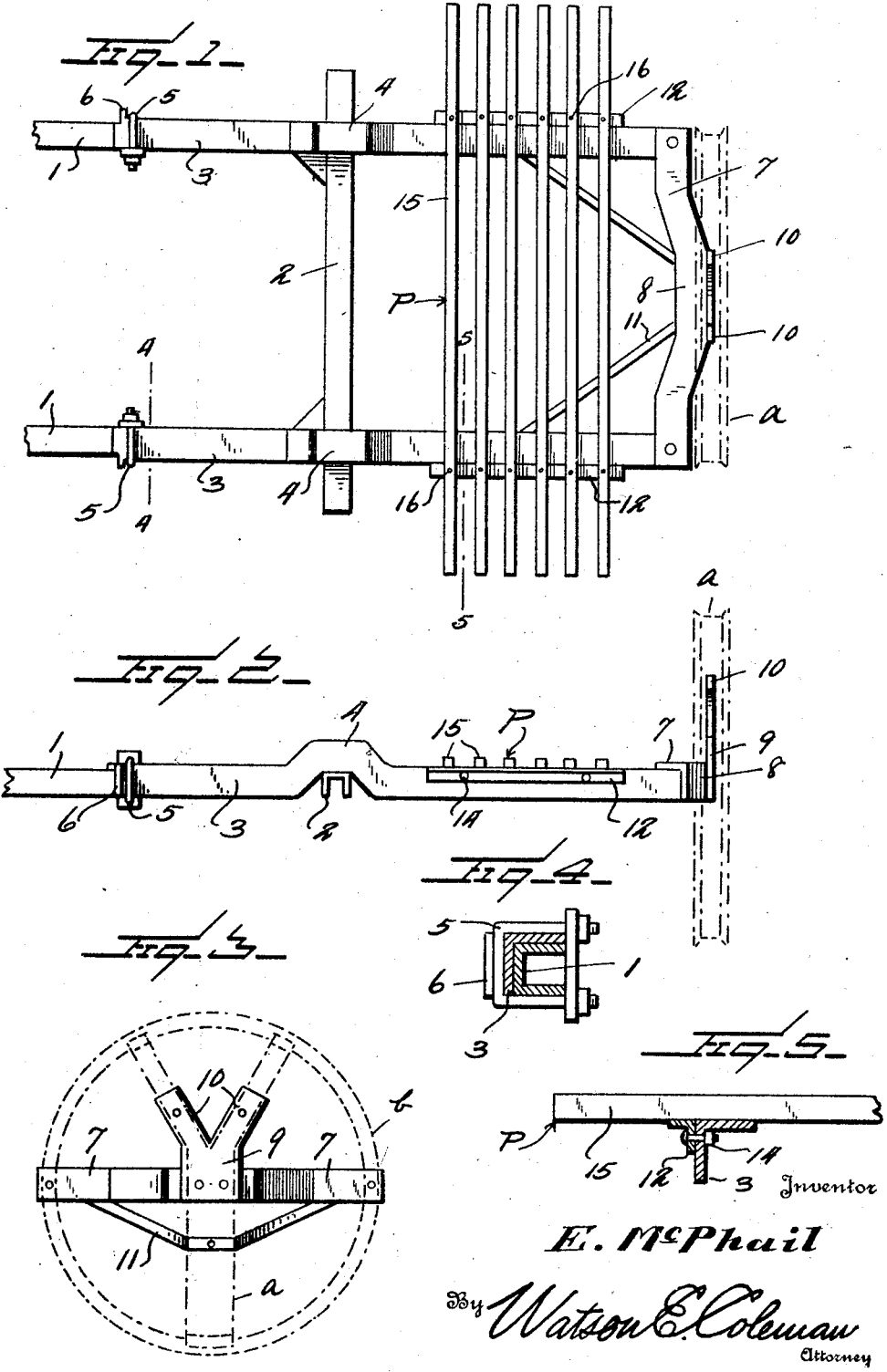
Inventor
E. McPhail
By Watson E. Coleman
Attorney Patented Mar. 8, 1927.

1,620,218

UNITED STATES PATENT OFFICE.

EWEN McPHAIL, OF MISSOULA, MONTANA.

LUGGAGE CARRIER.

Application filed June 22, 1926. Serial No. 117,807.

This invention relates to luggage carriers and it is an object of the invention to provide a device of this kind constructed in a manner whereby it may be readily and conveniently connected with a vehicle frame or chassis and which is provided with means whereby the tire carrier may be effectively held thereby.

The invention consists in the details of construction and in the combination and arrangement of the several parts of my improved luggage carrier whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan illustrating a luggage carrier constructed in accordance with an embodiment of my invention in applied position, an applied tire carrier being indicated by broken lines and a coacting portion of a vehicle frame or chassis being shown in fragment;

Figure 2 is a view in side elevation of the structure as illustrated in Figure 1;

Figure 3 is a view in rear elevation of the structure as illustrated in Figure 1 with the applied tire carrier indicated by broken lines;

Figure 4 is a detailed sectional view taken substantially on the line 4—4 of Figure 1;

Figure 5 is a detailed sectional view taken substantially on the line 5—5 of Figure 1.

As disclosed in the accompanying drawing, 1 denotes the rear end portions of the side members or sills of an automobile frame or chassis and 2 the rear cross end sills thereof.

My improved carrier comprises the parallel side members 3 each constituting an angle iron having the rear portion of its upper flange resting upon the rear portion of a side member or sill 1. A portion of each if the side members 3 is upwardly arched, as at 4, to permit the same to properly bridge the end sill 2. The side members 3 are held to the members or sills 1 by the U-clamp bolts 5 and the vertical flange of each of the members 3 is provided with an outstanding lip 6 whereby the associated clamp bolt 5 is effectually held against displacement with respect to the applied carrier.

The outer end portions of the members 3 are tied or connected by a cross sill 7 having its central portion outwardly arched. To the outer face of the intermediate portion 8 of said arch is bolted the lower portion of an upstanding plate 9 the upper portion of which being provided with the diverging arms 10 whereby the plate in its entirety is of substantially a Y-formation. The arms 10 are adapted to be bolted or otherwise secured to a substantially intermediate Y-shaped member $a$ arranged within a tire carrier $b$, the same being indicated by broken lines in the accompanying drawing and are of a well known type.

I also find it of advantage to provide the cross sill 7 with a substantially V-shaped attaching bar 11 depending from the side members 3. The central portion of this bar 11 is adapted to be bolted or otherwise attached to the stem of the Y-shaped member $a$ comprised in the structure of the tire carrier.

A slatted platform P is rested upon the side members 3 and comprises the angle irons 12 extending transversely of the platform and having close contact with the vertical flanges of the members 3. These irons 12 are secured to such vertical flanges by the bolts 14 or the like. Slats 15 are riveted, as at 16, or otherwise secured to the irons 12.

The side members 3 are of a length to extend a desired distance beyond the rear of the body of the vehicle and the platform P provides means whereby a suitable load, such as a box, trunk or the like, may be carried thereby. It is also to be understood that access may be had to the platform P without requiring the removal of the tire carrier T.

From the foregoing description it is thought to be obvious that a luggage carrier constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with the side members and an end cross member of a vehicle frame, a carrier comprising angle side members, each of said side members of the carrier having a portion resting upon a side member of the frame, each of said side members of the carrier having an upwardly disposed arch to bridge the cross member of the frame, means for securing the side members of the carrier to the side members of the frame, a cross member connecting the outer end portions of the side members of the carrier, the intermediate portion of said cross member of the carrier being outwardly arched, and means carried by the arch of the cross member of the carrier to engage a tire carrier.

2. In combination with the side members and an end cross member of a vehicle frame, a carrier comprising angle side members, each of said side members of the carrier having a portion resting upon a side member of the frame, each of said side members of the carrier having an upwardly disposed arch to bridge the cross member of the frame, means for securing the side members of the carrier to the side members of the frame, a cross member connecting the outer end portions of the side members of the carrier, the intermediate portion of said cross member of the carrier being outwardly arched, and an upstanding plate carried by the arch of the cross member of the carrier, said plate being substantially Y-shaped.

3. In combination with the side members and an end cross member of a vehicle frame, a carrier comprising angle side members, each of said side members of the carrier having a portion resting upon a side member of the frame, each of said side members of the carrier having an upwardly disposed arch to bridge the cross member of the frame, means for securing the side members of the carrier to the side members of the frame, a cross member connecting the outer end portions of the side members of the carrier, the intermediate portion of said cross member of the carrier being outwardly arched, an upstanding plate carried by the arch of the cross member of the carrier, said plate being substantially Y-shaped, and a substantially V-shaped bar carried by and extending forwardly from the side members.

In testimony whereof I hereunto affix my signature.

EWEN McPHAIL.